US012189315B2

(12) United States Patent
Kusano et al.

(10) Patent No.: US 12,189,315 B2
(45) Date of Patent: Jan. 7, 2025

(54) IMAGE FORMING APPARATUS INCLUDING AN ELECTROPHOTOGRAPHIC PHOTORECEPTOR

(71) Applicant: FUJIFILM Business Innovation Corp., Tokyo (JP)

(72) Inventors: Keisuke Kusano, Kanagawa (JP); Masahiro Iwasaki, Kanagawa (JP); Yoichi Kigoshi, Kanagawa (JP); Yuki Oyamada, Kanagawa (JP); Kenta Ide, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/240,792

(22) Filed: Aug. 31, 2023

(65) Prior Publication Data

US 2024/0329557 A1 Oct. 3, 2024

(30) Foreign Application Priority Data

Mar. 27, 2023 (JP) ................................ 2023-050635

(51) Int. Cl.
*G03G 15/00* (2006.01)
*G03G 9/087* (2006.01)
(Continued)

(52) U.S. Cl.
CPC ....... *G03G 15/0216* (2013.01); *G03G 9/0872* (2013.01); *G03G 15/752* (2013.01); *G03G 21/0011* (2013.01)

(58) Field of Classification Search
CPC ............... G03G 15/0216; G03G 15/75; G03G 15/752; G03G 21/0011; G03G 9/0872; G03G 5/06
See application file for complete search history.

(56) References Cited

U.S. PATENT DOCUMENTS

2021/0080843 A1* 3/2021 Sasaki .................. G03G 5/0592
2024/0012343 A1* 1/2024 Maki .................. G03G 21/1803
(Continued)

FOREIGN PATENT DOCUMENTS

JP 04-020507 A 1/1992
JP 2013-200418 A 10/2013

*Primary Examiner* — Sophia S Chen
(74) *Attorney, Agent, or Firm* — Sughrue Mion, PLLC

(57) ABSTRACT

An image forming apparatus includes an electrophotographic photoreceptor that has an outermost surface layer containing fluorine-containing resin particles, a charge transport material, and a binder resin, in which the number of carboxy groups contained in the fluorine-containing resin particles is 0 or greater and 30 or less per $10^6$ carbon atoms, and the outermost surface layer has a tan δ of 0.025 or greater and 0.030 or less, a charging device that comes into direct contact with the electrophotographic photoreceptor and applies only a DC voltage to charge the electrophotographic photoreceptor, an electrostatic latent image forming device that forms an electrostatic latent image on a surface of the charged electrophotographic photoreceptor, a developing device that develops the electrostatic latent image formed on the surface of the electrophotographic photoreceptor with a developer containing a toner to form a toner image, a transfer device that transfers the toner image by bringing the electrophotographic photoreceptor and a medium to be transferred into direct contact with each other, and a cleaning device that cleans the surface of the electrophotographic photoreceptor.

15 Claims, 2 Drawing Sheets

(51) Int. Cl.
*G03G 15/02* (2006.01)
*G03G 21/00* (2006.01)

(56) References Cited

U.S. PATENT DOCUMENTS

2024/0118636 A1* 4/2024 Oyamada ............... G03G 15/75
2024/0118653 A1* 4/2024 Kusano ................ G03G 15/752

* cited by examiner

IMAGE FORMING APPARATUS INCLUDING AN ELECTROPHOTOGRAPHIC PHOTORECEPTOR

CROSS-REFERENCE TO RELATED APPLICATIONS

This application is based on and claims priority under 35 USC 119 from Japanese Patent Application No. 2023-050635 filed Mar. 27, 2023.

BACKGROUND

(i) Technical Field

The present invention relates to an image forming apparatus.

(ii) Related Art

The formation of an image by an electrophotographic method is performed, for example, by charging a surface of a photoreceptor, forming an electrostatic charge image on the surface of the photoreceptor according to image information, developing the electrostatic charge image with a developer containing a toner to form a toner image, and transferring and fixing the toner image to a surface of a recording medium.

JP2013-200418A discloses "an electrophotographic photoreceptor including a conductive substrate, and a photosensitive layer provided on the conductive substrate, in which a surface layer positioned on a surface side where the photosensitive layer is provided contains fluorine-based resin particles and an alkyl fluoride group-containing copolymer, a mass loss ratio in a case where the surface layer is heated at 120° C. for 0.5 hours is 1.5% by mass or greater and 3.0% by mass or less, and a film thickness of the surface layer is 26 μm or greater and 50 μm or less".

SUMMARY

It was found that in an image forming apparatus including an electrophotographic photoreceptor that has an outermost surface layer containing fluorine-containing resin particles in the related art (hereinafter, also referred to as a specific image forming apparatus), a carboxy group contained in the fluorine-containing resin particles greatly affects the charging performance, and a local abnormal discharge phenomenon unique to a model that employs a contact charging method (DC-BCR charging method) of performing charging by DC current application is promoted.

Meanwhile, in a case where the carboxy group is simply removed, the outermost surface layer is difficult to absorb moisture, the viscoelasticity of the film is changed, and the cleaning performance is difficult to ensure in a model that employs a direct transfer method in which a toner is likely to remain on the electrophotographic photoreceptor.

Aspects of non-limiting embodiments of the present disclosure relate to an image forming apparatus that suppresses a local abnormal discharge phenomenon and has excellent cleaning properties as compared with a case where the outermost surface layer of the electrophotographic photoreceptor has a tan δ of less than 0.025 or greater than 0.03 or the outermost surface layer of the electrophotographic photoreceptor has a residual solvent amount of less than 0.1% by mass or greater than 0.5% by mass in the specific image forming apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Specific means for achieving the above-described object includes the following aspects.

According to an aspect of the present disclosure, there is provided an image forming apparatus including: an electrophotographic photoreceptor that has an outermost surface layer containing fluorine-containing resin particles, a charge transport material, and a binder resin, in which the number of carboxy groups contained in the fluorine-containing resin particles is 0 or greater and 30 or less per $10^6$ carbon atoms, and the outermost surface layer has a tan δ of 0.025 or greater and 0.030 or less; a charging device that comes into direct contact with the electrophotographic photoreceptor and applies only a DC voltage to charge the electrophotographic photoreceptor; an electrostatic latent image forming device that forms an electrostatic latent image on a surface of the charged electrophotographic photoreceptor; a developing device that develops the electrostatic latent image formed on the surface of the electrophotographic photoreceptor with a developer containing a toner to form a toner image; a transfer device that transfers the toner image by bringing the electrophotographic photoreceptor and a medium to be transferred into direct contact with each other; and a cleaning device that cleans the surface of the electrophotographic photoreceptor.

BRIEF DESCRIPTION OF THE DRAWINGS

Exemplary embodiment(s) of the present invention will be described in detail based on the following figures, wherein.

DETAILED DESCRIPTION

Figure 1:
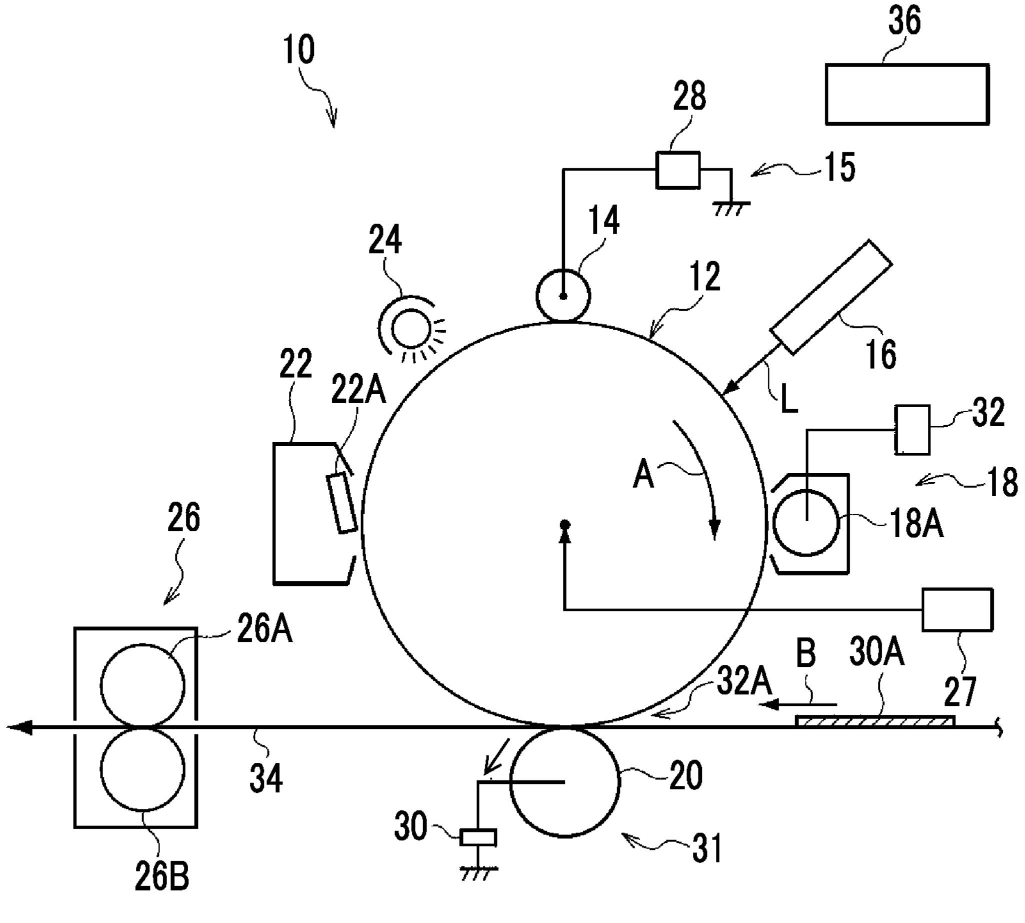
FIG. 1 is a schematic configuration view showing an example of an image forming apparatus according to the present exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, in a case where an exemplary embodiment is described with reference to drawings, the configuration of the exemplary embodiment is not limited to the configuration shown in the drawings. In addition, the sizes of members in each drawing are conceptual and the relative relation in the sizes between the members is not limited thereto.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, the term "(meth)acryl" may denote any of "acryl" or "methacryl".

In the present disclosure, an alkyl group is any of linear, branched, or cyclic unless otherwise specified.

Image Forming Apparatus

An image forming apparatus according to a first exemplary embodiment is an image forming apparatus including an electrophotographic photoreceptor that has an outermost surface layer containing fluorine-containing resin particles, a charge transport material, and a binder resin, in which the number of carboxy groups contained in the fluorine-containing resin particles is 0 or greater and 30 or less per $10^6$ carbon atoms, and the outermost surface layer has a tan δ of 0.025 or greater and 0.030 or less, a charging device that comes into direct contact with the electrophotographic photoreceptor and applies only a DC voltage to charge the electrophotographic photoreceptor, an electrostatic latent image forming device that forms an electrostatic latent image on a surface of the charged electrophotographic photoreceptor, a developing device that develops the electrostatic latent image formed on the surface of the electrophotographic photoreceptor with a developer containing a toner to form a toner image, a transfer device that transfers the toner image by bringing the electrophotographic photoreceptor and a medium to be transferred into direct contact with each other, and a cleaning device that cleans the surface of the electrophotographic photoreceptor.

An image forming apparatus according to a second exemplary embodiment is an image forming apparatus including an electrophotographic photoreceptor that has an outermost surface layer containing fluorine-containing resin particles, a charge transport material, and a binder resin, in which the number of carboxy groups contained in the fluorine-containing resin particles is 0 or greater and 30 or less per $10^6$ carbon atoms, and an amount of a residual solvent in the outermost surface layer is 0.1% by mass or greater and 0.5% by mass or less, a charging device that comes into direct contact with the electrophotographic photoreceptor and applies only a DC voltage to charge the electrophotographic photoreceptor, an electrostatic latent image forming device that forms an electrostatic latent image on a surface of the charged electrophotographic photoreceptor, a developing device that develops the electrostatic latent image formed on the surface of the electrophotographic photoreceptor with a developer containing a toner to form a toner image, a transfer device that transfers the toner image by bringing the electrophotographic photoreceptor and a medium to be transferred into direct contact with each other, and a cleaning device that cleans the surface of the electrophotographic photoreceptor.

Hereinafter, matters common to both the image forming apparatus according to the first exemplary embodiment and the image forming apparatus according to the second exemplary embodiment will be referred to as "present exemplary embodiment".

Hereinafter, an image forming apparatus including an electrophotographic photoreceptor, a charging device that comes into direct contact with the electrophotographic photoreceptor and applies only a DC voltage to charge the electrophotographic photoreceptor, an electrostatic latent image forming device that forms an electrostatic latent image on a surface of the charged electrophotographic photoreceptor, a developing device that develops the electrostatic latent image formed on the surface of the electrophotographic photoreceptor with a developer containing a toner to form a toner image, a transfer device that transfers the toner image by bringing the electrophotographic photoreceptor and a medium to be transferred into direct contact with each other, and a cleaning device that cleans the surface of the electrophotographic photoreceptor will also be referred to as "specific image forming apparatus".

In the related art, in order to improve the abrasion resistance of an electrophotographic photoreceptor, a technique of allowing an outermost surface layer of an electrophotographic photoreceptor to contain fluorine-containing resin particles to improve the lubricity of the surface of the film is known. However, it was found that in a case where a specific image forming apparatus of the related art, including an electrophotographic photoreceptor having an outermost surface layer containing fluorine-containing resin particles is used in combination with a contact charging method (DC-BCR charging method) of performing charging by DC current application, a carboxy group in the fluorine-containing resin particles contained in the outermost surface layer of the electrophotographic photoreceptor affects the charging performance, and a local abnormal discharge phenomenon is promoted. In a case where the carboxy group in the fluorine-containing resin particles is simply removed in order to fix the problem, since the outermost surface layer is difficult to absorb moisture, the viscoelasticity of the film of the outermost surface layer tends to be changed. As a result, the toner is likely to remain on the electrophotographic photoreceptor, and thus the cleaning performance is likely to be degraded.

On the contrary; since the image forming apparatus according to the present exemplary embodiment has the above-described configuration, the local abnormal discharge phenomenon is suppressed and the cleaning properties are excellent. The mechanism is not necessarily clear, but is assumed as follows.

In the image forming apparatus according to the present exemplary embodiment, the outermost surface layer of the electrophotographic photoreceptor contains fluorine-containing resin particles, a charge transport material, and a binder resin, and the number of carboxy groups contained in the fluorine-containing resin particles is 0 or greater and 30 or less per $10^6$ carbon atoms. That is, the number of carboxy groups contained in the fluorine-containing resin particles is maintained to be low. Therefore, the influence of the carboxy group on the contact charging method can be suppressed to be low.

Further, in the image forming apparatus according to the first exemplary embodiment, the loss tangent tan δ of the outermost surface layer of the electrophotographic photoreceptor is 0.025 or greater and 0.030 or less. That is, the viscoelasticity of the outermost surface layer is not extremely high or low, which is appropriate, and the toner remaining on the outermost surface layer is reduced. As a result, degradation of cleaning performance is suppressed.

Further, in the image forming apparatus according to the second exemplary embodiment, the amount of the residual solvent in the outermost surface layer of the electrophotographic photoreceptor is 0.1% by mass or greater and 0.5% by mass or less. That is, since the proportion of the residual solvent in the outermost surface layer is appropriate, appropriate hygroscopicity is imparted to the outermost surface layer by the residual solvent. As a result, excessive fluctuations in the viscoelasticity of the film of the outermost surface layer are suppressed, and degradation of the cleaning performance is suppressed.

The image forming apparatus according to the present exemplary embodiment includes an electrophotographic photoreceptor, a charging device that comes into direct contact with the electrophotographic photoreceptor and applies only a DC voltage to charge the electrophotographic photoreceptor, an electrostatic latent image forming device that forms an electrostatic latent image on a surface of the charged electrophotographic photoreceptor, a developing device that develops the electrostatic latent image formed on the surface of the electrophotographic photoreceptor with a developer containing a toner to form a toner image, a transfer device that transfers the toner image by bringing the electrophotographic photoreceptor and a medium to be transferred into direct contact with each other, and a cleaning device that cleans the surface of the electrophotographic photoreceptor.

The image forming apparatus may further include a fixing device that fixes the toner image transferred to a surface of a recording medium.

Here, as the image forming apparatus according to the present exemplary embodiment, known image forming apparatuses such as a direct transfer type apparatus that transfers the toner image formed on the surface of the photoreceptor directly to the recording medium, an intermediate transfer type apparatus that primarily transfers the toner image formed on the surface of the photoreceptor to the surface of the intermediate transfer member and secondarily transfers the toner image transferred to the surface of the intermediate transfer member to the surface of the recording medium, or an apparatus including a charge erasing device that applies charge erasing light to the surface of the photoreceptor after the transfer of the toner image and before the charging to erase the charges are employed.

In a case of the intermediate transfer type apparatus, the transfer device is, for example, configured to include an intermediate transfer member having a surface onto which the toner image is transferred, a primary transfer device primarily transferring the toner image formed on the surface of the photoreceptor to the surface of the intermediate transfer member, and a secondary transfer device secondarily transferring the toner image transferred to the surface of the intermediate transfer member to the surface of the recording medium.

In the image forming apparatus according to the present exemplary embodiment, the portion including at least the photoreceptor may constitute a unit for an image forming apparatus and may have a cartridge structure (process cartridge) that is attachable to and detachable from the image forming apparatus.

Further, the process cartridge according to the present exemplary embodiment is not limited to the above-described configuration including the electrophotographic photoreceptor and the cleaning device, and the process cartridge may have, for example, a configuration including at least one selected from other devices such as a charging device, an electrostatic charge image forming device, a developing device, and a transfer device, as necessary.

Hereinafter, an example of the image forming apparatus according to the present exemplary embodiment will be described, but the present exemplary embodiment is not limited thereto. Further, main parts shown in the figures will be described, but description of other parts will not be provided.

FIG. 1 is a schematic configuration view showing an example of the image forming apparatus according to the present exemplary embodiment.

An image forming apparatus 10 according to the present exemplary embodiment includes a photoreceptor 12 as shown in FIG. 1. The photoreceptor 12 has a columnar shape, is connected to a driving unit 27 such as a motor via a drive force transmission member (not shown) such as a gear, and is rotationally driven by the driving unit 27 around a rotation axis indicated by a black spot. In the example shown in FIG. 1, the photoreceptor 12 is rotationally driven in a direction indicated by an arrow A.

For example, a charging device 15, an electrostatic charge image forming device 16, a developing device 18, a transfer device 31, a cleaning device 22, and a charge erasing device 24 are provided in the vicinity of the photoreceptor 12 in order in a rotation direction of the photoreceptor 12. Further, the image forming apparatus 10 is also provided with a fixing device 26 including a fixing member 26A and a pressure member 26B disposed in contact with the fixing member 26A. Further, the image forming apparatus 10 includes a control device 36 that controls the operation of each device (each unit). Further, a unit including the photoreceptor 12, the charging device 15, the electrostatic charge image forming device 16, the developing device 18, the transfer device 31, and the cleaning device 22 corresponds to an image forming unit.

In the image forming apparatus 10, at least the photoreceptor 12 and the cleaning device 22 may be provided as process cartridges.

Electrophotographic Photoreceptor

Figure 2:
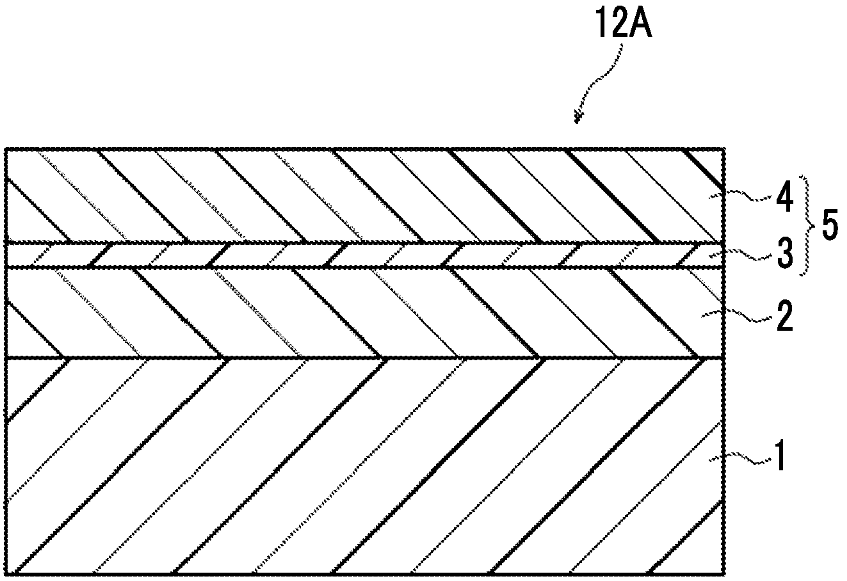
FIG. 2 is a partial cross-sectional view showing an example of a layer configuration of an electrophotographic photoreceptor.

FIG. 2 is a partial cross-sectional view schematically showing an example of the layer configuration of the photoreceptor.

A photoreceptor 12A shown in FIG. 2 includes a lamination type photosensitive layer. The photoreceptor 12A has a structure in which an undercoat layer 2, a charge generation layer 3, and a charge transport layer 4 are laminated in this order on a conductive substrate 1, and the charge generation layer 3 and the charge transport layer 4 constitute a photosensitive layer 5 (so-called function separation type photosensitive layer). The photoreceptor 12A may include a protective layer (not shown) on the charge transport layer 4 (that is, on the outer peripheral surface of the photosensitive layer 5). The photoreceptor 12A may include an interlayer (not shown) between the undercoat layer 2 and the charge generation layer 3.

Figure 3:
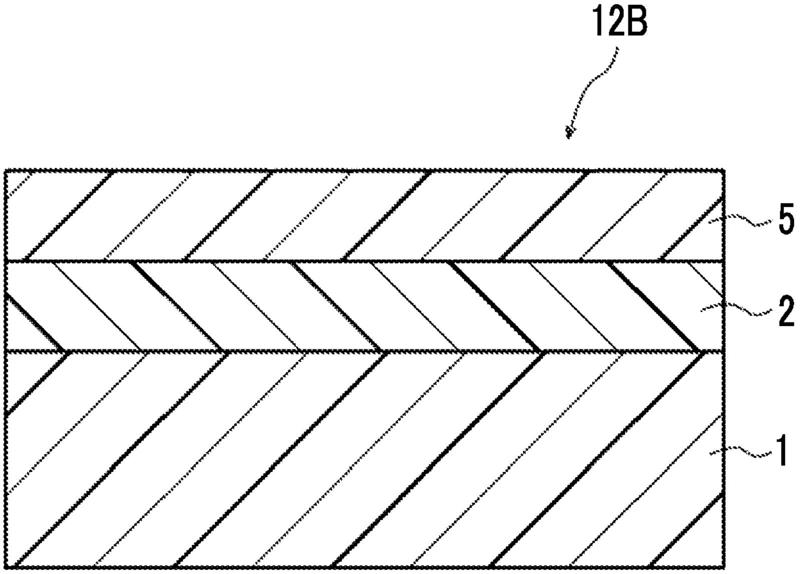
FIG. 3 is a partial cross-sectional view showing an example of a layer configuration of an electrophotographic photoreceptor.

FIG. 3 is a partial cross-sectional view schematically showing an example of the layer configuration of the photoreceptor.

A photoreceptor 12B shown in FIG. 3 includes a single layer type photosensitive layer. The photoreceptor 12B has a structure in which the undercoat layer 2 and a single layer type photosensitive layer 5 are laminated in this order on the conductive substrate 1. The photoreceptor 12B may include a protective layer (not shown) on the charge transport layer 4 (that is, on the outer peripheral surface of the photosensitive layer 5). The photoreceptor 12B may have an interlayer (not shown) between the undercoat layer 2 and the single layer type photosensitive layer 5.

Outermost Surface Layer

The outermost surface layer may be a photosensitive layer or a protective layer as long as the above-described characteristics are satisfied. In a case where the outermost surface layer of the electrophotographic photoreceptor is a photosensitive layer, the outermost surface layer denotes a charge transport layer or a single layer type photosensitive layer.

For example, in a case where the outermost surface layer contains a charge transport agent, the resistance of the outermost surface layer is lowered, and abnormal discharge is unlikely to occur. Further, since the outermost surface layer is appropriately abraded due to containing a material other than the binder resin, accumulation of a discharge product and a developer is suppressed. As described above, from the viewpoint of further suppressing the local abnormal discharge phenomenon and further improving the cleaning properties, for example, the outermost surface layer is preferably a photosensitive layer and more preferably a charge transport layer (that is, an upper layer in the lamination type photosensitive layer).

In the first exemplary embodiment, the outermost surface layer contains fluorine-containing resin particles, a charge transport material, and a binder resin, the number of carboxy groups contained in the fluorine-containing resin particles is 0 or greater and 30 or less per $10^6$ carbon atoms, and the outermost surface layer has a tan δ of 0.025 or greater and 0.030 or less.

In the second exemplary embodiment, the outermost surface layer contains fluorine-containing resin particles, a charge transport material, and a binder resin, the number of carboxy groups contained in the fluorine-containing resin particles is 0 or greater and 30 or less per $10^6$ carbon atoms, and the amount of the residual solvent in the outermost surface layer is 0.1% by mass or greater and 0.5% by mass or less.

In the first exemplary embodiment, the tan δ of the outermost surface layer is 0.025 or greater and 0.030 or less and, for example, preferably 0.026 or greater and 0.027 or less.

In the second exemplary embodiment, the tan δ of the outermost surface layer is, for example, preferably 0.025 or greater and 0.030 or less and more preferably 0.026 or greater and 0.027 or less.

In a case where the tan δ of the outermost surface layer is 0.025 or greater, appropriate viscoelasticity is imparted to the outermost surface layer. As a result, an extreme decrease in viscoelasticity of the film of the outermost surface layer is suppressed, and degradation of the cleaning performance is further suppressed.

In a case where the tan δ of the outermost surface layer is 0.030 or less, an extreme increase in viscoelasticity of the film of the outermost surface layer is suppressed, and degradation of the cleaning performance is further suppressed.

The loss coefficient tan δ is a value measured using a rheometer.

As the rheometer, for example, "ARES-G2" (product name, manufactured by TA Instruments Ltd.) can be used.

Hereinafter, the procedure for measuring the loss coefficient tan δ will be described in detail.

The outermost surface layer to be measured is cut out from the electrophotographic photoreceptor and molded at 25° C. using a press molding machine to prepare a measurement sample having a tablet shape (disk shape with a thickness of 2 mm and a diameter of 8 mm). Further, the loss coefficient is measured using this measurement sample with a rheometer under the following conditions.

The loss coefficient measured in a case where the measurement sample is at 25±1° C. is defined as a loss coefficient tan δ.

Conditions

Measuring device: rheometer ARES (manufactured by TA Instruments)

Fixture: 8 mm parallel plates

Gap: adjusted to 3 mm

Frequency: 1 Hz

A method of setting the tan δ of the outermost surface layer to be in the above-described range is not particularly limited, and examples thereof include a method of adjusting the temperature and time for drying a coating solution in the formation of the outermost surface layer (for example, a method of heating and drying a coating solution at a temperature of preferably 115° C. or higher and 155° C. or lower (more preferably 120° C. or higher and 145° C. or lower and still more preferably 125° C. or higher and 135° C. or lower) for 10 minutes or longer and 60 minutes or shorter (more preferably 20 minutes or longer and 40 minutes or shorter and still more preferably 25 minutes or longer and 35 minutes or shorter)).

A method of setting the amount of the residual solvent in the outermost surface layer to be in the above-described range is not particularly limited, and examples thereof include a method of adjusting the temperature and time for drying a coating solution in the formation of the outermost surface layer (for example, a method of heating and drying a coating solution at a temperature of preferably 115° C. or higher and 155° C. or lower (more preferably 120° C. or higher and 145° C. or lower and still more preferably 125° C. or higher and 135° C. or lower) for 10 minutes or longer and 60 minutes or shorter (more preferably 20 minutes or longer and 40 minutes or shorter and still more preferably 25 minutes or longer and 35 minutes or shorter)).

In the first exemplary embodiment, the amount of the residual solvent in the outermost surface layer is 0.10% by mass or greater and 0.50% by mass or less, for example, more preferably 0.15% by mass or greater and 0.40% by mass or less, and still more preferably 0.20% by mass or greater and 0.30% by mass or less.

In the second exemplary embodiment, the amount of the residual solvent in the outermost surface layer is 0.10% by mass or greater and 0.50% by mass or less, for example, preferably 0.15% by mass or greater and 0.40% by mass or less, and more preferably 0.20% by mass or greater and 0.30% by mass or less.

In a case where the amount of the residual solvent in the outermost surface layer is 0.10% by mass or greater, since the proportion of the residual solvent in the outermost surface layer is appropriate, appropriate hygroscopicity is imparted to the outermost surface layer by the residual solvent. As a result, an extreme decrease in viscoelasticity of the film of the outermost surface layer is suppressed, and degradation of the cleaning performance is further suppressed.

In a case where the amount of the residual solvent in the outermost surface layer is 0.50% by mass or less, an extreme increase in viscoelasticity of the film of the outermost surface layer due to an extreme increase in the proportion of the residual solvent contained in the outermost surface layer is suppressed, and thus degradation of the cleaning performance is further suppressed.

The amount of the residual solvent in the outermost surface layer can be measured as follows.

The outermost surface layer is cut out from the electrophotographic photoreceptor into an amount of 2 mg or greater and 3 mg or less to obtain a sample, and the measurement is performed using a heat extraction gas chromatogram mass analyzer. The sample is weighed, placed in a heat extraction device (PY2020D, manufactured by Frontier Laboratories Ltd.), and heated to 400° C. Volatile components are injected into a gas chromatogram mass analyzer (GCMS-QP2010, manufactured by Shimadzu Corporation) through an interface at 320° C. and quantified. That is, helium gas is injected into a column (capillary column UA-5, manufactured by Frontier Laboratories Ltd.) having an inner diameter Φ of 0.25 μm×30 m as the carrier gas in an amount of 1/51 (split ratio of 50:1) of the amount of the gas volatilized from the sample at a linear velocity of 153.8 cm/sec (carrier gas flow rate of 1.50 ml/min at a column temperature of 50° C., pressure of 50 kPa).

Next, the temperature is maintained at 50° C. for 3 minutes, the column is heated to 400° C. at a rate of 8° C. per minute and held at the same temperature for 10 minutes to desorb volatile components. Further, the volatile components are injected into the mass analyzer at an interface temperature of 320° C., and the area of the peak corresponding to the solvent is acquired. The quantification is performed by creating a calibration curve in advance with a known amount of the same solvent. The amount of the residual solvent is acquired by dividing the weight of the solvent acquired in the above-described manner by the weight of the sample. Here, the above-described measurement example is merely an example, and the measurement conditions may be changed depending on, for example, the decomposition or changing temperature of the resin to be used or the boiling point of the solvent.

A method of setting the amount of the residual solvent in the outermost surface layer to be in the above-described range is not particularly limited, and examples thereof include a method of adjusting the temperature and time for drying a coating solution in the formation of the outermost surface layer (for example, a method of performing heating and drying at preferably 115° C. or higher and 155° C. or lower (more preferably 120° C. or higher and 145° C. or lower and still more preferably 125° C. or higher and 135° C. or lower) for 10 minutes or longer and 60 minutes or shorter (more preferably 20 minutes or longer and 40 minutes or shorter and still more preferably 25 minutes or longer and 35 minutes or shorter)).

Hereinafter, aspects of both the image forming apparatus according to the first exemplary embodiment and the image forming apparatus according to the second exemplary embodiment will be described.

Fluorine-Containing Resin Particles

Examples of the fluorine-containing resin particles include a copolymer of two or more kinds of homopolymer particles of fluoroolefins, which are particles of a copolymer of one or two or more kinds of fluoroolefins and a non-fluorine-based monomer (that is, a monomer having no fluorine atoms). The fluorine-containing resin particles may be used alone or in combination of two or more kinds thereof.

Examples of the fluoroolefin include perhaloolefins such as tetrafluoroethylene (TFE), perfluorovinyl ether, hexafluoropropylene (HFP), and chlorotrifluoroethylene (CTFE), and non-perfluoroolefins such as vinylidene fluoride (VdF), trifluoroethylene, and vinyl fluoride. Among these, for example, VdF, TFE, CTFE, and HFP are preferable.

Further, examples of the non-fluorine-based monomer include hydrocarbon-based olefins such as ethylene, propylene, and butene; alkyl vinyl ether such as cyclohexyl vinyl ether (CHVE), ethyl vinyl ether (EVE), butyl vinyl ether, or methyl vinyl ether; alkenyl vinyl ether such as polyoxyethylene allyl ether (POEAE) or ethyl allyl ether; an organic silicon compound containing a reactive α,β-unsaturated group such as vinyltrimethoxysilane (VSi), vinyltriethoxysilane, or vinyltris(methoxyethoxy) silane; acrylic acid ester such as methyl acrylate or ethyl acrylate; methacrylic acid ester such as methyl methacrylate or ethyl methacrylate; and vinyl ester such as vinyl acetate, vinyl benzoate, or "VEOVA" (trade name, manufactured by Shell plc, vinyl ester). Among these, for example, an organic silicon compound containing alkyl vinyl ether, allyl vinyl ether, vinyl ester, or a reactive α,β-unsaturated group is preferable.

Among these, as the fluorine-containing resin particles, for example, particles having a high fluorination rate are preferable, particles of at least one resin selected from the group consisting of polytetrafluoroethylene (PTFE), a tetrafluoroethylene-hexafluoropropylene copolymer (FEP), a tetrafluoroethylene-perfluoro (alkyl vinyl ether) copolymer (PFA), an ethylene-tetrafluoroethylene copolymer (ETFE), and an ethylene-chlorotrifluoroethylene copolymer (ECTFE) are more preferable, particles of at least one resin selected from the group consisting of polytetrafluoroethylene (PTFE), a tetrafluoroethylene-hexafluoropropylene copolymer (FEP), and a tetrafluoroethylene-perfluoro (alkyl vinyl ether) copolymer (PFA) are still more preferable, and polytetrafluoroethylene (PTFE) particles are particularly preferable.

In a case where the fluorine-containing resin particles are particles of at least one resin selected from the above-described group, the proportion of the carboxy group in the fluorine-containing resin particles is likely to be adjusted to be low; and thus the influence of the carboxy group on charging can be suppressed to be low.

The number of carboxy groups contained in the fluorine-containing resin particles is 0 or greater and 30 or less, for example, preferably 0 or greater and 25 or less, and more preferably 0 or greater and 20 or less per $10^6$ carbon atoms.

In a case where the number of carboxy groups contained in the fluorine-containing resin particles is 0 or greater and 30 or less, the number of carboxy groups contained in the fluorine-containing resin particles is suppressed to be small, and thus the influence of the carboxy group on charging can be suppressed to be low.

Here, the carboxy group of the fluorine-containing resin particles is, for example, a carboxy group derived from a terminal carboxylic acid contained in the fluorine-containing resin particles.

The amount of carboxy groups in the fluorine-containing resin particles is measured in the following manner, as described in JP1992-20507A and the like.

The fluorine-containing resin particles are molded with a press machine in advance to prepare a film having a thickness of approximately 0.1 mm. The infrared absorption spectrum of the prepared film is measured. The infrared absorption spectrum of the fluorine-containing resin particles obtained by completely fluorinating a carboxylic acid terminal prepared by bringing fluorine gas into contact with the fluorine-containing resin particles is also measured, and the number of terminal carboxy groups is calculated by the following equation based on a difference between the infrared absorption spectra.

Number of terminal carboxy groups (per $10^6$ carbon atoms)=(l×K)/t l: absorbance K: correction coefficient t: film thickness (mm)

The absorption wavelength of the carboxy group is 3,560 $cm^{-1}$, and the correction coefficient is 440.

A method of setting the number of carboxy groups contained in the fluorine-containing resin particles to be in the above-described range is not particularly limited, and examples of the method include 1) a method in which radiation is not applied in the process of production of particles and 2) a method in which radiation is applied under a condition that oxygen is not present or under a condition that the oxygen concentration is reduced.

The average particle diameter of the fluorine-containing resin particles is, for example, preferably 0.1 μm or greater and 4.5 μm or less and more preferably 0.1 μm or greater and 1.0 μm or less.

In a case where the average particle diameter of the fluorine-containing resin particles is 0.2 μm or greater, an extreme decrease in viscoelasticity of the film of the outermost surface layer is suppressed, and degradation of the cleaning performance is further suppressed.

In a case where the average particle diameter of the fluorine-containing resin particles is 4.5 μm or less, an extreme increase in viscoelasticity of the film of the outermost surface layer is suppressed, and degradation of the cleaning performance is further suppressed.

The average particle diameter of the fluorine-containing resin particles can be measured as follows.

The average particle diameter of the fluorine-containing resin particles is calculated by capturing an image at a magnification of 20 times with a polarizing microscope (BX51-P, manufactured by Olympus Corporation), performing image processing to binarize the image, measuring the particle diameters (equivalent circle diameter) of 500 fluorine-containing resin particles observed from the outermost surface of the electrophotographic photoreceptor, and averaging the measured values.

Further, the binarization of the image is carried out by adjusting the thresholds of the hue, the chroma, and the brightness using image processing software OLYMPUS Stream essentials (manufactured by Olympus Corporation) such that the color of the aggregates of the crystal part and the hard segment is black and the color of the amorphous part (corresponding to the soft segment) is white.

The content of the fluorine-containing resin particles is, for example, preferably 1% by mass or greater and 20% by mass or less, more preferably 3% by mass or greater and 15% by mass or less, and still more preferably 5% by mass or greater and 10% by mass or less with respect to the total mass of the outermost surface layer.

In a case where the content of the fluorine-containing resin particles is 1% by mass or greater, an extreme decrease in viscoelasticity of the film of the outermost surface layer is suppressed, and degradation of the cleaning performance is further suppressed.

In a case where the content of the fluorine-containing resin particles is 20% by mass or less, an extreme increase in viscoelasticity of the film of the outermost surface layer is suppressed, and degradation of the cleaning performance is further suppressed. Further, due to the presence of an excessive amount of the fluorine-containing resin particles, the influence of a trace amount of the carboxy group contained in the fluorine-containing resin particles on charging can be suppressed to be low.

Examples of the charge transport material include the same materials as in the aspect of the charge transport material in the charge transport layer described below.

Examples of the binder resin include the same materials as in the aspect of the binder resin in the charge transport layer described below.

Hereinafter, each layer of the electrophotographic photoreceptor according to the present exemplary embodiment will be described in detail. Further, the reference numerals will not be provided.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. Further, in a case where incoherent light is used as a light source, roughening of the surface to prevent interference fringes is not particularly necessary, and roughening of the surface to prevent interference fringes is appropriate for longer life because occurrence of defects due to the roughness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $10^2$ Ωcm or greater and $10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy) silane, 2-(3,4-epoxy cyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophene compound; and a diphenoquinone compound such as 3,3,5,5'-tetra-t-butyldiphenoquinone.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

Further, the electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy) silane, 2-(3,4-epoxy cyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The film thickness of the undercoat layer is set to, for example, preferably 15 μm or greater and more preferably 20 μm or greater and 50 μm or less.

Interlayer

Although not shown in the figures, an interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, an air knife coating method, and a curtain coating method.

The film thickness of the interlayer is set to be, for example, preferably in a range of 0.1 μm or greater and 3 μm or less. Further, the interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is, for example, preferable in a case where an incoherent light source such as a light emitting diode (LED) or an organic electroluminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

Further, the n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $10^{13}$ Ωcm or greater.

These binder resins may be used alone or in the form of a mixture of two or more kinds thereof.

Further, the blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. Further, the charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type high-pressure homogenizer in which a dispersion liquid is dispersed by a liquid-liquid collision or a liquid-wall collision in a high-pressure state, and a penetration type high-pressure homogenizer in which dispersion is performed by causing a dispersion liquid to pass through a micro-flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The film thickness of the charge generation layer is set to be, for example, in a range of preferably 0.1 μm or greater and 5.0 μm or less and more preferably in a range of 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

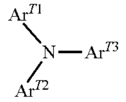

In Structural Formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

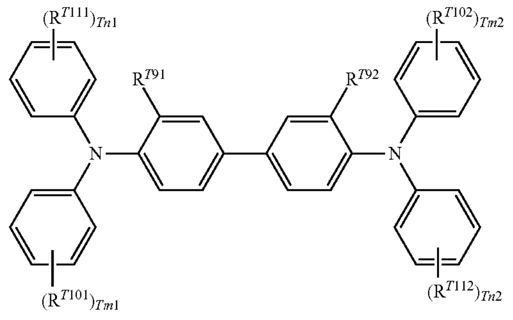

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, —C($R^{T12}$)=C($R^{T13}$)($R^{T14}$), or —CH=CH—CH=C($R^{T15}$)($R^{T16}$), and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "—$C_6H_4$—CH=CH—CH=C($R^{T7}$)($R^{T8}$)" and a benzidine derivative having "—CH=CH—CH=C($R^{T15}$)($R^{T16}$)" are particularly preferable from the viewpoint of the charge mobility.

As the polymer charge transport material, known materials having charge transport properties, such as poly-N-vinylcarbazole and polysilane, can be used. Particularly, for example, a polyester-based polymer charge transport material is particularly preferable. Further, the polymer charge transport material may be used alone or in combination of binder resins.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, for example, a polycarbonate resin or a polyarylate resin is preferable as the binder resin. These binder resins may be used alone or in combination of two or more kinds thereof.

Further, the blending ratio between the charge transport material and the binder resin is, for example, preferably in a range of 10:1 to 1:5 in terms of the mass ratio.

The charge transport layer may also contain other known additives.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The film thickness of the charge transport layer is set to be, for example, preferably in a range of 5 μm or greater and 50 μm or less and more preferably in a range of 10 μm or greater and 30 μm or less.

Protective Layer

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)

2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], —$NH_2$, —SH, —COOH, and —$SiR^{Q1}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a styryl group (vinylphenyl group), an acryloyl group, a methacryloyl group, and a group containing at least one selected from derivatives thereof. Among these, from the viewpoint that the reactivity is excellent, for example, a vinyl group, a styryl group (vinylphenyl group), an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

In addition, the coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, an air knife coating method, and a curtain coating method.

The film thickness of the protective layer is set to be, for example, preferably in a range of 1 μm or greater and 20 μm or less and more preferably in a range of 2 μm or greater and 10 μm or less.

Single Layer Type Photosensitive Layer

The single layer type photosensitive layer (charge generation/charge transport layer) is, for example, a layer containing a charge generation material, a charge transport material, a binder resin, and as necessary, other known additives. Further, these materials are the same as the materials described in the sections of the charge generation layer and the charge transport layer.

Further, the content of the charge generation material in the single layer type photosensitive layer may be, for example, 0.1% by mass or greater and 10% by mass or less and preferably 0.8% by mass or greater and 5% by mass or less with respect to the total solid content. Further, the content of the charge transport material in the single layer type photosensitive layer may be, for example, 5% by mass or greater and 50% by mass or less with respect to the total solid content.

The method of forming the single layer type photosensitive layer is the same as the method of forming the charge generation layer or the charge transport layer.

The film thickness of the single layer type photosensitive layer may be, for example, 5 μm or greater and 50 μm or less and preferably 10 μm or greater and 40 μm or less.

Charging Device

The charging device 15 charges the surface of the photoreceptor 12. The charging device 15 is provided, for example, on the surface of the photoreceptor 12 in a contact or non-contact manner and includes a charging member 14 that charges the surface of the photoreceptor 12 and a power supply 28 (an example of a voltage applying unit for the charging member) that applies a charging voltage to the charging member 14. The power supply 28 is electrically connected to the charging member 14.

Examples of the charging member 14 of the charging device 15 include a contact type charger using a conductive charging roller, a charging brush, a charging film, a charging rubber blade, a charging tube, or the like. Further, examples of the charging member 14 also include a known charger such as a non-contact type roller charger, or a scorotron charger or a corotron charger using corona discharge.

Electrostatic Charge Image Forming Device

The electrostatic charge image forming device 16 forms an electrostatic charge image on the surface of the charged photoreceptor 12. Specifically, for example, the electrostatic charge image forming device 16 irradiates the surface of the photoreceptor 12 charged by the charging member 14 with light L modulated based on image information of an image to be formed so that an electrostatic charge image according to the image of image information is formed on the photoreceptor 12.

Examples of the electrostatic charge image forming device 16 include an optical system device that includes a light source imagewise-exposing the surface of the electrophotographic photoreceptor to light such as a semiconductor laser beam, LED light, or liquid crystal shutter light.

Developing Device

The developing device 18 is provided, for example, on the downstream side of the photoreceptor 12 in a rotation direction with respect to an irradiation position of the light L using the electrostatic charge image forming device 16. An accommodating portion that accommodates a developer is provided in the developing device 18. A developer that contains a toner containing toner particles and an external additive is accommodated in the accommodating portion. The toner is accommodated, for example, in a charged state in the developing device 18.

The developing device 18 includes, for example, a developing member 18A that develops the electrostatic charge image formed on the surface of the photoreceptor 12 with the developer which contains a toner containing toner particles and an external additive, and a power supply 32 that applies a developing voltage to the developing member 18A. The developing member 18A is electrically connected to, for example, the power supply 32.

The developing member 18A of the developing device 18 is selected depending on the kind of developer, and examples thereof include a developing roll having a developing sleeve with a built-in magnet.

The developing device 18 (including the power supply 32) is, for example, electrically connected to the control device 36 provided in the image forming apparatus 10, is driven and controlled by the control device 36, and applies a developing voltage to the developing member 18A. The developing member 18A to which the developing voltage has been applied is charged with a developing potential according to the developing voltage. Further, the developing member 18A charged with the developing potential, for example, holds the developer accommodated in the developing device 18 on the surface and supplies the toner contained in the developer to the surface of the photoreceptor 12 from the inside of the developing device 18. The formed electrostatic charge image is developed as a toner image on the surface of the photoreceptor 12 to which the toner has been supplied.

Transfer Device

The transfer device 31 is provided, for example, on the downstream side of the photoreceptor 12 in the rotation direction with respect to the position where the developing member 18A is disposed. The transfer device 31 includes, for example, a transfer member 20 that transfers a toner image formed on the surface of the photoreceptor 12 to a recording medium 30A and a power supply 30 that applies a transfer voltage to the transfer member 20. The transfer member 20 has, for example, a columnar shape and transports the recording medium 30A in a state of sandwiching the recording medium 30A between the photoreceptor 12 and the transfer member 20. The transfer member 20 is, for example, electrically connected to the power supply 30.

Examples of the transfer member 20 include a contact type transfer charger using a belt, a roller, a film, or a rubber cleaning blade and a known non-contact type transfer charger such as a scorotron transfer charger or a corotron transfer charger using corona discharge.

The transfer device 31 (including the power supply 30) is, for example, electrically connected to the control device 36 provided in the image forming apparatus 10, is driven and controlled by the control device 36, and applies a transfer voltage to the transfer member 20. The transfer member 20 to which the transfer voltage has been applied is charged with a transfer potential according to the transfer voltage.

In a case where a transfer voltage having a polarity opposite to the polarity of the toner constituting the toner image formed on the photoreceptor 12 is applied to the transfer member 20 from the power supply 30 of the transfer member 20, a transfer electric field with an electric field intensity for moving each toner constituting the toner image on the photoreceptor 12 to the transfer member 20 side from the photoreceptor 12 using an electrostatic force is formed, for example, in a region where the photoreceptor 12 and the transfer member 20 face each other (see a transfer region 32A in FIG. 1).

The recording medium 30A is, for example, accommodated in an accommodating portion (not shown), is transported from the accommodating portion along a transport path 34 by a plurality of transporting members (not shown), and reaches the transfer region 32A, which is the region where the photoreceptor 12 and the transfer member 20 face each other. In the example shown in FIG. 1, the recording medium 30A is transported in a direction indicated by an arrow B. In the recording medium 30A that has reached the transfer region 32A, for example, the toner image on the photoreceptor 12 is transferred by the transfer electric field formed in the region by application of the transfer voltage to the transfer member 20. That is, for example, the toner image is transferred onto the recording medium 30A by the movement of the toner from the surface of the photoreceptor 12 to the recording medium 30A. Further, the toner image on the photoreceptor 12 is transferred onto the recording medium 30A by the transfer electric field.

Cleaning Device

The cleaning device 22 includes a cleaning blade 22A that comes into contact with the surface of the photoreceptor 12 and cleans the surface of the photoreceptor 12.

The cleaning device 22 is provided on the downstream side of the photoreceptor 12 in the rotation direction with respect to the transfer region 32A. The cleaning device 22 cleans the residual toner particles adhered to the photoreceptor 12 after the toner image is transferred to the recording medium 30A. The cleaning device 22 cleans an adhesive material such as paper dust in addition to the residual toner particles.

The cleaning device 22 includes the cleaning blade 22A and brings the tip of the cleaning blade 22A into contact with the photoreceptor 12 in a direction facing the rotation direction to remove the adhesive material (including residual toner particles) on the surface of the photoreceptor 12.

Charge Erasing Device

The charge erasing device 24 is provided, for example, on a downstream side of the photoreceptor 12 in the rotation direction with respect to the cleaning device 22. The charge erasing device 24 exposes the surface of the photoreceptor 12 to erase the charges on the surface after the toner image is transferred. Specifically, for example, the charge erasing device 24 is electrically connected to the control device 36 provided in the image forming apparatus 10 and is driven and controlled by the control device 36 to expose all surfaces of the photoreceptor 12 (specifically, for example, the entire surface of the image forming area) so that the charges on the surfaces are erased.

Examples of the charge erasing device 24 include a device having a light source such as a tungsten lamp that irradiates white light and a device having a light source such as a light emitting diode (LED) that irradiates red light.

Fixing Device

The fixing device 26 is provided, for example, on a downstream side of the transport path 34 of the recording medium 30A in the transport direction with respect to the transfer region 32A. The fixing device 26 has a fixing member 26A and a pressure member 26B disposed in contact with the fixing member 26A and fixes the toner image transferred onto the recording medium 30A at a contact portion between the fixing member 26A and the pressure member 26B. Specifically, for example, the fixing device 26 is electrically connected to the control device 36 provided in the image forming apparatus 10, is driven and controlled by the control device 36, and fixes the toner image transferred onto the recording medium 30A to the recording medium 30A by heat and a pressure.

Examples of the fixing device 26 include a fixing machine known per se, such as, a thermal roller fixing machine or an oven fixing machine.

Specifically, for example, a known fixing device including a fixing roll or a fixing belt as the fixing member 26A and a pressure roll or a pressure belt as the pressure member 26B is employed as the fixing device 26.

Here, the recording medium 30A transported along the transport path 34 and to which the toner image is transferred by passing through a region (transfer region 32A) where the photoreceptor 12 and the transfer member 20 face each other reaches, for example, the installation position of the fixing device 26 along the transport path 34 by the transporting member (not shown) so that the toner image is fixed onto the recording medium 30A.

The recording medium 30A in which the image is formed by fixing the toner image is discharged to the outside of the image forming apparatus 10 by a plurality of transporting members (not shown). Further, the photoreceptor 12 is charged with a charging potential by the charging device 15 again after the erasing of the charges by the charge erasing device 24.

Operation of Image Forming Apparatus

An example of the operation of the image forming apparatus 10 according to the present exemplary embodiment will be described. Further, various operations of the image forming apparatus 10 are performed by a control program executed by the control device 36.

The image forming operation of the image forming apparatus 10 will be described.

First, the surface of the photoreceptor 12 is charged by the charging device 15. The electrostatic charge image forming device 16 exposes the surface of the charged photoreceptor 12 based on the image information. In this manner, an electrostatic charge image according to the image information is formed on the photoreceptor 12. In the developing device 18, the electrostatic charge image formed on the surface of the photoreceptor 12 is developed by a developer containing a toner. In this manner, a toner image is formed on the surface of the photoreceptor 12.

In the transfer device 31, the toner image formed on the surface of the photoreceptor 12 is transferred to the recording medium 30A. The toner image transferred to the recording medium 30A is fixed by the fixing device 26.

Meanwhile, the surface of the photoreceptor 12 after the toner image has been transferred is cleaned by the cleaning blade 22A in the cleaning device 22, and the charges on the surface are erased by the charge erasing device 24.

The configuration of the image forming apparatus described in the present exemplary embodiment is merely an example, and the configuration may be changed within a range not departing from the gist of the present exemplary embodiment.

EXAMPLES

Hereinafter, exemplary embodiments of the invention will be described in detail based on examples, but the exemplary embodiments of the invention are not limited to the examples. In the following description, "parts" and "%" are on a mass basis unless otherwise specified.

In the following description, the synthesis, the treatment, the production, and the like are carried out at room temperature (25° C.±3° C.) unless otherwise specified.

Production of Fluorine-Containing Resin Particles

Production of Fluorine-Containing Resin Particles (1)

Fluorine-containing resin particles (1) are produced in the following manner.

An autoclave is charged with 3 liters of deionized water, 3.0 g of ammonium perfluorooctanoate, and 110 g of paraffin wax (manufactured by Nippon Seiro Co., Ltd.) as an emulsion stabilizer, the inside of the system is substituted with nitrogen three times and with tetrafluoroethylene (TFE) two times to remove oxygen, the internal pressure is adjusted to 1.0 MPa by TFE, and the internal temperature is maintained at 70° C. while the mixture is stirred at 250 rpm. Next, the inside of the system is charged with a 20 ml aqueous solution prepared by dissolving 150 cc of ethane at normal pressure as a chain transfer agent and 300 mg of ammonium persulfate as a polymerization initiator so that the reaction is started. During the reaction, the temperature inside the system is maintained at 70° C., and TFE is continuously supplied so that the internal pressure of the autoclave is constantly maintained at 1.0±0.05 MPa. In a case where the amount of TFE consumed in the reaction reaches 1,000 g after the addition of the initiator, the supply of TFE and the stirring of the mixture are stopped, and the reaction is terminated. Thereafter, the particles are separated by centrifugation, 400 parts by mass of methanol is further collected, washed with a stirrer at 250 rpm for 10 minutes while being irradiated with ultrasonic waves, and the supernatant is filtered. The present operation is repeated three times, and the filtrate is dried at 60° C. for 17 hours under reduced pressure. The fluorine-containing resin particles (1) are produced by performing the above-described steps.

Production of Fluorine-Containing Resin Particles (c1)

Fluorine-containing resin particles (c1) are produced in the following manner.

100 parts by mass of a commercially available homopolytetrafluoroethylene fine powder (standard specific gravity of 2.175 measured in conformity with ASTM D 4895 (2004)) and 2.4 parts by mass of ethanol as an additive are added to a bag made of barrier nylon. Thereafter, the bag is irradiated with 150 kGy of cobalt-60γ rays in air at room temperature to obtain low-molecular-weight polytetrafluoroethylene powder. The obtained powder is pulverized, thereby obtaining the fluorine-containing resin particles (c1).

Production of Fluorine-Containing Resin Particles (2) to (6)

The fluorine-containing resin particles (2) to (6) are produced by adjusting the kind and the amount of the additive in the method of producing fluorine resin particles and the energy intensity of γ-rays to be applied in the production of the fluorine-containing resin particles (c1) and adjusting the number of carboxy groups contained in the fluorine-containing resin particles and the average particle diameter of the fluorine-containing resin particles as listed in Table 1.

Production of Electrophotographic Photoreceptor Including Lamination Type Photosensitive Layer Electrophotographic Photoreceptor (P1)

Formation of Undercoat Layer

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM-603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmφ glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer with an average thickness of 24 μm.

Formation of Charge Generation Layer

A mixture of 15 parts of hydroxygallium phthalocyanine as a charge generation material (having diffraction peaks at positions where Bragg angles (2θ±0.2° in the X-ray diffraction spectrum using Cukα characteristic X-rays are at least of 7.5°, 9.9°, 12.5, 16.3°, 18.6°, 25.1°, and) 28.3°, 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The undercoat layer is immersed in and coated with the coating solution for forming a charge generation layer, and dried at room temperature (25° C.±3° C.) to form a charge generation layer having an average thickness of 0.18 μm.

Formation of Charge Transport Layer 45 parts of a benzidine compound represented by Formula (CTM1) as a charge transport material and 55 parts of a polymer compound (viscosity average molecular weight: 40,000) having a repeating unit represented by Formula (PCZ1) as a binder resin are dissolved in 350 parts of toluene and 150 parts of tetrahydrofuran, 9.8 parts of the fluorine-containing resin particles (1) and 1 part of a fluorine-containing dispersant GF400 (manufactured by Toagosei Co., Ltd.) are added to the solution, and the solution is treated with a high-pressure homogenizer 5 times, thereby preparing a coating solution for a charge transport layer.

The charge generation layer is coated with the obtained coating solution by a dip coating method and heated at 130° C. for 45 minutes, thereby forming a charge transport layer having a film thickness of 31 μm.

(CTM1)

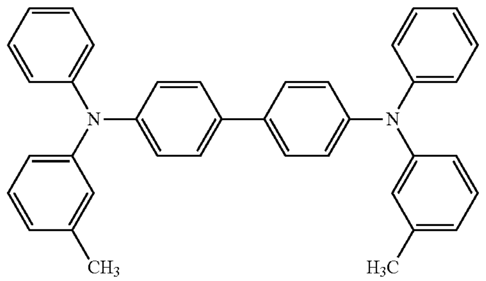

(PCZ1)

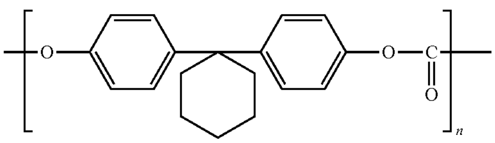

Electrophotographic Photoreceptors (P2) to (P12) and Photoreceptors (CP1) to (CP3)

Each electrophotographic photoreceptor is prepared in the same manner as that for the electrophotographic photoreceptor (P1) except that the kind of the fluorine-containing resin particles is changed as listed in Table 1 and the time for heating and drying the coating film is changed as listed in Table 1 in the formation of the charge transport layer.

Production of Photoreceptor Including Single Layer Type Photosensitive Layer

Electrophotographic Photoreceptor (P13)

Formation of Undercoat Layer

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmφ glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer with an average thickness of 24 μm.

Formation of Single Layer Type Photosensitive Layer 45.75 parts of the polyester resin as a binder resin, 1.25 parts of V-type hydroxygallium phthalocyanine as a charge generation material (having diffraction peaks at positions where Bragg angles (2θ±0.2° in an X-ray diffraction spectrum using Cukα characteristic X-rays are at least 7.3°, 16.0°, 24.9°, and) 28.0°, 9 parts of ETM-1 as an electron transport material, 44 parts of CTM1 (the compound described above) as a charge transport material, 9.8 parts by the fluorine-containing resin particles (1), 1 part of a fluorine-containing dispersant GF400 (manufactured by Toagosei Co., Ltd.), and 175 parts of tetrahydrofuran and 75 parts of toluene as solvents are mixed, and the mixture is subjected to a dispersion treatment in a sand mill for 4 hours using glass beads having a diameter of 1 mm, thereby obtaining a coating solution for forming a photosensitive layer. The undercoat layer is immersed in and coated with the coating solution for forming a photosensitive layer and dried and cured at a temperature of 130° C. for 45 minutes, thereby forming a single layer type photosensitive layer having an average thickness of 30 μm.

ETM-1

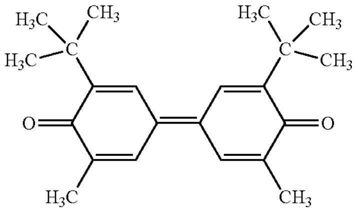

The following characteristics of the fluorine-containing resin particles are measured by the methods described above. The results are listed in Table 1.

"Number of carboxy groups per $10^6$ carbon atoms"

Tan δ of outermost surface layer

Amount of residual solvent in outermost surface layer

In the table, the amount of the residual solvent in the outermost surface layer of the electrophotographic photoreceptor is listed in the columns of [amount of residual solvent (% by mass)]. In the table, the loss tangent tan δ of the outermost surface layer of the electrophotographic photoreceptor is listed in the columns of [tan δ]. In the table, the drying conditions of the coating film in the step of preparing the charge transport layer are listed in the columns of [conditions for drying coating film].

Preparation of Image Forming Apparatus

Each electrophotographic photoreceptor obtained as described above is attached to DocuPrint C2110 (manufactured by FUJIFILM Business Innovation Corp.) in the combinations listed in the table to obtain an image forming apparatus of each example.

Method of Evaluating Abnormal Discharge 5,000 sheets of random text charts with an image density of 5% are continuously printed on A4 paper using the image forming apparatus of each example in a high-temperature and high-humidity environment of 28° C. and 85 RH %. Thereafter, a 20% halftone image is output, the number of minute color lines on the image is counted, and abnormal discharge is evaluated according to the following standards.

A: Abnormal discharge is not found

B: The number of color lines is 1 or greater and less than 5

C: The number of color lines is 5 or greater and less than 11

D: The number of color lines is 11 or greater

Method of Evaluating Cleaning Properties 10,000 sheets of random charts with an image density of 1% are output using the image forming apparatus of each example, and one sheet of an A3-sized image with an image density of 100% is output. Immediately after the output of the A3-sized image, streaks due to the residues remaining on the surface of the photoreceptor in the modified machine are observed, the number of streaks is counted, and the cleaning properties are evaluated according to the following standards.

A: Streaks are not found

B: The number of streaks is 2 or less

C: The number of streaks is 3 or greater and 5 or less

D: A plurality of streaks are generated on the entire surface

TABLE 1

| | | Fluorine-containing resin particles | | | | | Conditions for drying coating film | | | | Evaluation | |
|---|---|---|---|---|---|---|---|---|---|---|---|---|
| | Electrophotographic photoreceptor | Type | Number of carboxy groups | Resin | Average particle diameter (μm) | Content (% by mass) | Temperature (° C.) | Drying time (min) | Amount of residual solvent (% by mass) | tanδ | Abnormal discharge | Cleaning properties |
| Example 1 | P1 | 1 | 0 | PTFE | 0.12 | 8.84 | 130 | 30 | 0.25 | 0.026 | A | A |
| Example 2 | P2 | 2 | 7 | PTFE | 0.15 | 8.84 | 130 | 30 | 0.25 | 0.026 | A | A |
| Example 3 | P3 | 3 | 18 | PTFE | 0.15 | 8.84 | 130 | 30 | 0.25 | 0.026 | A | A |
| Example 4 | P4 | 4 | 22 | PTFE | 0.15 | 8.84 | 130 | 30 | 0.25 | 0.026 | B | A |
| Example 5 | P5 | 5 | 29 | PTFE | 0.15 | 8.84 | 130 | 30 | 0.25 | 0.026 | C | A |
| Example 6 | P6 | 2 | 7 | PTFE | 0.15 | 8.84 | 140 | 40 | 0.11 | 0.025 | A | C |
| Example 7 | P7 | 2 | 7 | PTFE | 0.15 | 8.84 | 130 | 40 | 0.20 | 0.025 | A | B |
| Example 8 | P8 | 2 | 7 | PTFE | 0.15 | 8.84 | 140 | 10 | 0.30 | 0.027 | A | B |
| Example 9 | P9 | 2 | 7 | PTFE | 0.15 | 8.84 | 125 | 30 | 0.44 | 0.028 | A | C |
| Example 10 | P10 | 1 | 0 | PTFE | 0.12 | 8.84 | 120 | 30 | 0.6 | 0.029 | A | C |
| Example 11 | P11 | 1 | 0 | PTFE | 0.12 | 8.84 | 140 | 60 | 0.05 | 0.025 | A | A |
| Example 12 | P12 | 6 | 22 | PTFE | 4.66 | 8.84 | 130 | 30 | 0.25 | 0.026 | C | B |
| Example 13 | P13 | 2 | 7 | PTFE | 0.15 | 8.84 | 130 | 30 | 0.25 | 0.026 | A | A |
| Comparative Example 1 | CP1 | c1 | 75 | PTFE | 0.15 | 8.84 | 130 | 30 | 0.25 | 0.026 | D | A |
| Comparative Example 2 | CP2 | 2 | 7 | PTFE | 0.15 | 8.84 | 165 | 40 | 0.02 | 0.024 | A | D |
| Comparative Example 3 | CP3 | 2 | 7 | PTFE | 0.15 | 8.84 | 110 | 40 | 1.60 | 0.031 | A | D |

As listed in the table, it may be seen that the image forming apparatuses of the examples suppress a local abnormal discharge phenomenon and have excellent cleaning properties as compared with the image forming apparatuses of the comparative examples.

(((1))) An image forming apparatus comprising:

an electrophotographic photoreceptor that has an outermost surface layer containing fluorine-containing resin particles, a charge transport material, and a binder resin, in which the number of carboxy groups contained in the fluorine-containing resin particles is 0 or greater and 30 or less per $10^6$ carbon atoms, and the outermost surface layer has a tan δ of 0.025 or greater and 0.030 or less;

a charging device that comes into direct contact with the electrophotographic photoreceptor and applies only a DC voltage to charge the electrophotographic photoreceptor;

an electrostatic latent image forming device that forms an electrostatic latent image on a surface of the charged electrophotographic photoreceptor;

a developing device that develops the electrostatic latent image formed on the surface of the electrophotographic photoreceptor with a developer containing a toner to form a toner image;

a transfer device that transfers the toner image by bringing the electrophotographic photoreceptor and a medium to be transferred into direct contact with each other; and a cleaning device that cleans the surface of the electrophotographic photoreceptor.

(((2))) The image forming apparatus according to (((1))), wherein an amount of a residual solvent in the outermost surface layer is 0.1% by mass or greater and 0.5% by mass or less.

(((3))) The image forming apparatus according to (((2))), wherein the amount of the residual solvent in the outermost surface layer is 0.15% by mass or greater and 0.4% by mass or less.

(((4))) The image forming apparatus according to any one of (((1))) to (((3))), wherein the number of carboxy groups contained in the fluorine-containing resin particles is 0 or greater and 25 or less per $10^6$ carbon atoms.

(((5))) The image forming apparatus according to (((4))), wherein the number of carboxy groups contained in the fluorine-containing resin particles is 0 or greater and 20 or less per $10^6$ carbon atoms.

(((6))) The image forming apparatus according to any one of (((1))) to (((5))).

wherein the fluorine-containing resin particles have an average particle diameter of 0.1 μm or greater and 4.5 μm or less.

(((7))) The image forming apparatus according to any one of (((1))) to (((6)

wherein the fluorine-containing resin particles are particles of at least one resin selected from the group consisting of polytetrafluoroethylene, a tetrafluoroethylene-hexafluoropropylene copolymer, a tetrafluoroethylene-perfluoro (alkylvinyl ether) copolymer, an ethylene-tetrafluoroethylene copolymer, and an ethylene-chlorotrifluoroethylene copolymer.

(((8))) The image forming apparatus according to (((7))), wherein the fluorine-containing resin particles are polytetrafluoroethylene particles.

(((9))) An image forming apparatus comprising:

an electrophotographic photoreceptor that has an outermost surface layer containing fluorine-containing resin particles, a charge transport material, and a binder resin, in which the number of carboxy groups contained in the fluorine-containing resin particles is 0 or greater and 30 or less per $10^6$ carbon atoms, and an amount of a residual solvent in the outermost surface layer is 0.1% by mass or greater and 0.5% by mass or less;

a charging device that comes into direct contact with the electrophotographic photoreceptor and applies only a DC voltage to charge the electrophotographic photoreceptor;

an electrostatic latent image forming device that forms an electrostatic latent image on a surface of the charged electrophotographic photoreceptor;

a developing device that develops the electrostatic latent image formed on the surface of the electrophotographic photoreceptor with a developer containing a toner to form a toner image;

a transfer device that transfers the toner image by bringing the electrophotographic photoreceptor and a medium to be transferred into direct contact with each other; and a cleaning device that cleans the surface of the electrophotographic photoreceptor.

(((10))) The image forming apparatus according to (((9))), wherein the amount of the residual solvent in the outermost surface layer is 0.15% by mass or greater and 0.4% by mass or less.

(((11))) The image forming apparatus according to (((9))) or ((10))), wherein the number of carboxy groups contained in the fluorine-containing resin particles is 0 or greater and 25 or less per $10^6$ carbon atoms.

(((12))) The image forming apparatus according to (((11))), wherein the number of carboxy groups contained in the fluorine-containing resin particles is 0 or greater and 20 or less per $10^6$ carbon atoms.

((((13)))) The image forming apparatus according to any one of (((9))) to (((12))), wherein the fluorine-containing resin particles have an average particle diameter of 0.1 μm or greater and 4.5 μm or less.

((((14)))) The image forming apparatus according to any one of (((9))) to (((13))), wherein the fluorine-containing resin particles are particles of at least one resin selected from the group consisting of polytetrafluoroethylene, a tetrafluoroethylene-hexafluoropropylene copolymer, a tetrafluoroethylene-perfluoro (alkylvinyl ether) copolymer, an ethylene-tetrafluoroethylene copolymer, and an ethylene-chlorotrifluoroethylene copolymer.

((((15)))) The image forming apparatus according to (((14))), wherein the fluorine-containing resin particles are polytetrafluoroethylene particles.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an electrophotographic photoreceptor that has an outermost surface layer containing fluorine-containing resin particles, a charge transport material, and a binder resin, in which a number of carboxy groups contained in the fluorine-containing resin particles is 0 or greater and 30 or less per $10^6$ carbon atoms, and the outermost surface layer has a tan δ of 0.025 or greater and 0.030 or less;

a charging device that comes into direct contact with the electrophotographic photoreceptor and applies only a DC voltage to charge the electrophotographic photoreceptor;

an electrostatic latent image forming device that forms an electrostatic latent image on a surface of the charged electrophotographic photoreceptor;

a developing device that develops the electrostatic latent image formed on the surface of the charged electrophotographic photoreceptor with a developer containing a toner to form a toner image;

a transfer device that transfers the toner image by bringing the electrophotographic photoreceptor and a medium to be transferred into direct contact with each other; and a cleaning device that cleans the surface of the charged electrophotographic photoreceptor.

2. The image forming apparatus according to claim 1, wherein an amount of a residual solvent in the outermost surface layer is 0.1% by mass or greater and 0.5% by mass or less.

3. The image forming apparatus according to claim 2, wherein the amount of the residual solvent in the outermost surface layer is 0.15% by mass or greater and 0.4% by mass or less.

4. The image forming apparatus according to claim 1, wherein the number of carboxy groups contained in the fluorine-containing resin particles is 0 or greater and 25 or less per $10^6$ carbon atoms.

5. The image forming apparatus according to claim 4, wherein the number of carboxy groups contained in the fluorine-containing resin particles is 0 or greater and 20 or less per $10^6$ carbon atoms.

6. The image forming apparatus according to claim 1, wherein the fluorine-containing resin particles have an average particle diameter of 0.1 μm or greater and 4.5 μm or less.

7. The image forming apparatus according to claim 1, wherein the fluorine-containing resin particles are particles of at least one resin selected from the group consisting of polytetrafluoroethylene, a tetrafluoroethylene-hexafluoropropylene copolymer, a tetrafluoroethylene-perfluoro (alkylvinyl ether) copolymer, an ethylene-tetrafluoroethylene copolymer, and an ethylene-chlorotrifluoroethylene copolymer.

8. The image forming apparatus according to claim 7, wherein the fluorine-containing resin particles are polytetrafluoroethylene particles.

9. An image forming apparatus comprising:

an electrophotographic photoreceptor that has an outermost surface layer containing fluorine-containing resin particles, a charge transport material, and a binder resin, in which a number of carboxy groups contained in the fluorine-containing resin particles is 0 or greater and 30 or less per $10^6$ carbon atoms, and an amount of a residual solvent in the outermost surface layer is 0.1% by mass or greater and 0.5% by mass or less;

a charging device that comes into direct contact with the electrophotographic photoreceptor and applies only a DC voltage to charge the electrophotographic photoreceptor;

an electrostatic latent image forming device that forms an electrostatic latent image on a surface of the charged electrophotographic photoreceptor;

a developing device that develops the electrostatic latent image formed on the surface of the charged electrophotographic photoreceptor with a developer containing a toner to form a toner image;

a transfer device that transfers the toner image by bringing the electrophotographic photoreceptor and a medium to be transferred into direct contact with each other; and a cleaning device that cleans the surface of the charged electrophotographic photoreceptor.

10. The image forming apparatus according to claim 9, wherein the amount of the residual solvent in the outermost surface layer is 0.15% by mass or greater and 0.4% by mass or less.

11. The image forming apparatus according to claim 9, wherein the number of carboxy groups contained in the fluorine-containing resin particles is 0 or greater and 25 or less per $10^6$ carbon atoms.

12. The image forming apparatus according to claim 11, wherein the number of carboxy groups contained in the fluorine-containing resin particles is 0 or greater and 20 or less per $10^6$ carbon atoms.

13. The image forming apparatus according to claim 9, wherein the fluorine-containing resin particles have an average particle diameter of 0.1 μm or greater and 4.5 μm or less.

14. The image forming apparatus according to claim 9, wherein the fluorine-containing resin particles are particles of at least one resin selected from the group consisting of polytetrafluoroethylene, a tetrafluoroethylene-hexafluoropropylene copolymer, a tetrafluoroethylene-perfluoro (alkylvinyl ether) copolymer, an ethylene-tetrafluoroethylene copolymer, and an ethylene-chlorotrifluoroethylene copolymer.

15. The image forming apparatus according to claim 14, wherein the fluorine-containing resin particles are polytetrafluoroethylene particles.

* * * * *